(12) United States Patent
Harada et al.

(10) Patent No.: US 11,198,749 B2
(45) Date of Patent: Dec. 14, 2021

(54) POLYMER MATERIAL

(71) Applicants: DAIKIN INDUSTRIES, LTD., Osaka (JP); OSAKA UNIVERSITY, Osaka (JP)

(72) Inventors: Akira Harada, Osaka (JP); Hiroyasu Yamaguchi, Osaka (JP); Yoshinori Takashima, Osaka (JP); Suguru Nomimura, Osaka (JP); Hikaru Aramoto, Osaka (JP); Ryohei Ikura, Osaka (JP); Masaki Nakahata, Osaka (JP); Kazuhisa Iwaso, Osaka (JP); Kentarou Hiraga, Osaka (JP); Akinari Sugiyama, Osaka (JP); Fumihiko Yamaguchi, Osaka (JP); Takashi Nomura, Osaka (JP)

(73) Assignees: DAIKIN INDUSTRIES, LTD., Osaka (JP); OSAKA UNIVERSITY, Osaka (JP)

( * ) Notice: Subject to any disclaimer, the term of this patent is extended or adjusted under 35 U.S.C. 154(b) by 94 days.

(21) Appl. No.: 16/326,957

(22) PCT Filed: Aug. 23, 2017

(86) PCT No.: PCT/JP2017/030213
§ 371 (c)(1),
(2) Date: Feb. 21, 2019

(87) PCT Pub. No.: WO2018/038186
PCT Pub. Date: Mar. 1, 2018

(65) Prior Publication Data
US 2019/0177455 A1 Jun. 13, 2019

(30) Foreign Application Priority Data

Aug. 23, 2016 (JP) ............................. JP2016-163073
Nov. 28, 2016 (JP) ............................. JP2016-229704

(51) Int. Cl.

| | |
|---|---|
| *C08F 220/56* | (2006.01) |
| *C08F 290/12* | (2006.01) |
| *C08L 33/06* | (2006.01) |
| *C09D 133/00* | (2006.01) |
| *C09D 201/04* | (2006.01) |
| *C08L 101/02* | (2006.01) |
| *C08F 251/00* | (2006.01) |
| *C08F 220/18* | (2006.01) |
| *C08J 3/11* | (2006.01) |
| *C09D 133/06* | (2006.01) |
| *C09D 133/26* | (2006.01) |
| *C09K 3/10* | (2006.01) |
| *B01D 39/16* | (2006.01) |

(52) U.S. Cl.
CPC .......... *C08F 220/56* (2013.01); *C08F 220/18* (2013.01); *C08F 220/1802* (2020.02); *C08F 251/00* (2013.01); *C08F 290/12* (2013.01); *C08J 3/11* (2013.01); *C08L 33/06* (2013.01); *C08L 101/02* (2013.01); *C09D 133/00* (2013.01); *C09D 133/062* (2013.01); *C09D 133/26* (2013.01); *C09D 201/04* (2013.01); *C09K 3/1009* (2013.01); *B01D 39/16* (2013.01); *C09K 2200/0637* (2013.01)

(58) Field of Classification Search
CPC .... C08F 220/56; C08F 290/12; C08F 251/00; C08F 220/18; C08F 220/1802; C08J 3/11; C09D 133/00; C09D 201/04; C09D 133/062; C09D 133/26; C09K 3/1009; C09K 2200/0637; B01D 39/16
See application file for complete search history.

(56) References Cited

U.S. PATENT DOCUMENTS

| | | | |
|---|---|---|---|
| 5,856,416 | A | 1/1999 | Bachmann et al. |
| 2013/0046058 | A1 | 2/2013 | Pham et al. |
| 2013/0172479 | A1 | 7/2013 | Harada et al. |

(Continued)

FOREIGN PATENT DOCUMENTS

| | | |
|---|---|---|
| CN | 105859969 | 8/2016 |
| JP | 2005-306917 | 11/2005 |
| JP | 2009-120759 | 6/2009 |

(Continued)

OTHER PUBLICATIONS

Extended European Search Report dated Mar. 13, 2020 in corresponding European Patent Application No. 17843664.8.

(Continued)

*Primary Examiner* — Patrick D Niland
(74) *Attorney, Agent, or Firm* — Wenderoth, Lind & Ponack, L.L.P.

(57) ABSTRACT

An object of the present invention is to provide a macromolecular material that exhibits excellent elongation. The first macromolecular material of the present invention contains the first polymer containing the first structural unit and the second polymer containing the second structural unit. The first structural unit has a guest group in its side chain, and the second structural unit has a host group in its side chain. At least one of the first and the second polymers contains at least one fluorine group. The second macromolecular material of the present invention contains the first structural unit having a guest group in its side chain, the second structural unit having a host group in its side chain, and the third structural unit other than the first and second structural units. At least one of the first, the second, and the third structural units contains at least one fluorine group.

18 Claims, No Drawings

(56) References Cited

U.S. PATENT DOCUMENTS

2015/0073091 A1  3/2015  Harada et al.
2018/0133986 A1  5/2018  Harada et al.

FOREIGN PATENT DOCUMENTS

| JP | 2011-231267 | 11/2011 |
| JP | 2012-153766 | 8/2012 |
| JP | 2014-178670 | 9/2014 |
| JP | 2015-189972 | 11/2015 |
| WO | 2012/036069 | 3/2012 |
| WO | 2013/162019 | 10/2013 |
| WO | 2016/163550 | 10/2016 |

OTHER PUBLICATIONS

Wang et al., "Supramolecular polymer assembly in aqueous solution arising from cyclodextrin host-guest complexation," Beilstein Journal of Organic Chemistry, Dec. 2015, vol. 12, pp. 50-72.
International Search Report dated Oct. 31, 2017 in International (PCT) Application No. PCT/JP2017/030213.

POLYMER MATERIAL

TECHNICAL FIELD

The present invention relates to fluorine-based macromolecular materials.

BACKGROUND ART

Macromolecular materials have a variety of applications, such as in components or surface coating agents for cellular phones, displays, automobiles, etc. Among the macromolecular materials, fluorine-based macromolecular materials, typically including fluorine resins, fluorine rubber, fluorine coating compositions, fluorine-containing repellents, and fluorine coating agents, are excellent in lubricity, water repellency, oil repellency, heat resistance, oil resistance, weatherability, antifouling properties, and chemical resistance, compared to versatile hydrocarbon-based macromolecular materials. These fluorine-based macromolecular materials can be used without the need for maintenance for a long time, because they do not degrade in harsh environments, and are not damaged in appearance. Taking advantage of these features, fluorine-based macromolecular materials have been in practical use, such as in chemical feeding tubes and pipe packing in semiconductor manufacturing lines, fuel pipe hoses, and paint for outdoors (see, for example, PTL 1 and 2).

CITATION LIST

Patent Literature

PTL 1: JP2012-153766A
PTL 2: JP2011-231267A

SUMMARY OF INVENTION

Technical Problem

However, known fluorine-based macromolecular materials are inferior in elongation to hydrocarbon-based materials other than fluorine-based macromolecular materials. Thus, there has been demand for the development of fluorine-based macromolecular materials that also have such properties.

The present invention was made in view of this problem, and an object of the invention is to provide a macromolecular material that has excellent elongation.

Solution to Problem

The present inventors conducted extensive research to achieve the object, and found that the object can be achieved by introducing a host group and a guest group that can have host-guest interaction into a fluorine-based macromolecular material, and completed the present invention.

Specifically, the present invention includes, for example, the subject matter described in the following items.

Item 1
A macromolecular material comprising
a first polymer containing a first structural unit, and
a second polymer containing a second structural unit,
the first structural unit having a guest group in the side chain thereof, and
the second structural unit having a host group in the side chain thereof,
wherein at least one of the first polymer and the second polymer has at least one fluorine group.

Item 2
A macromolecular material comprising
a first structural unit having a guest group in the side chain thereof,
a second structural unit having a host group in the side chain thereof, and
a third structural unit that is other than the first structural unit and the second structural unit,
wherein at least one structural unit of the first structural unit, the second structural unit, and the third structural unit has at least one fluorine group.

Item 3
The macromolecular material according to Item 1 or 2, wherein the guest group has at least one fluorine group.

Item 4
The macromolecular material according to any one of Items 1 to 3, wherein the total number of fluorine groups present in the first structural unit and the second structural unit is 4 or more.

Item 5
The macromolecular material according to any one of Items 1 to 4, wherein
the first structural unit includes
a structure represented by the following formula (1a)

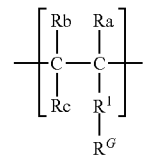

(1a)

wherein
Ra represents hydrogen, methyl, or fluorine,
Rb represents hydrogen or fluorine,
Rc represents hydrogen or fluorine,
$R^1$ represents a divalent group formed by removing one hydrogen atom from a monovalent group selected from the group consisting of hydroxyl, thiol, alkoxy optionally having at least one substituent, thioalkoxy optionally having at least one substituent, alkyl optionally having at least one substituent, amino optionally having at least one substituent, amide optionally having at least one substituent, phenyl optionally having at least one substituent, aldehyde, and carboxyl, and/or —O—$(CH_2$—$CH_2$—O$)_n$— (n is 1 to 20), and
$R^G$ represents the guest group, and/or
a structure represented by the following formula (1'a)

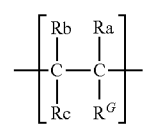

(1'a)

wherein
Ra, Rb, Rc, and $R^G$ are as defined in formula (1a).

Item 6
The macromolecular material according to Item 5, wherein $R^G$ represents a hydrocarbon group.

Item 7

The macromolecular material according to Item 6, wherein $R^G$ represents alkyl having at least one fluorine group.

Item 8

The macromolecular material according to any one of Items 5 to 7, wherein $R^G$ has 40 or fewer carbon atoms.

Item 9

The macromolecular material according to Item 8, wherein $R^G$ has 3 to 20 carbon atoms.

Item 10

The macromolecular material according to any one of Items 1 to 9, wherein the host group is a cyclodextrin or a derivative thereof.

Item 11

The macromolecular material according to any one of Items 1 to 9, wherein the host group is a group famed by bonding methylene to an oxygen atom derived from hydroxyl of a cyclodextrin or a derivative thereof, and the methylene is further bonded to the main chain or side chain of the second structural unit.

Item 12

The macromolecular material according to any one of Items 1 to 11, comprising a (meth)acrylic acid ester as a structural unit.

Item 13

The macromolecular material according to any one of Items 1 to 12, which is a gel containing a solvent.

Item 14

The macromolecular material according to any one of Items 1 to 13, which is for use in at least one member selected from the group consisting of coating films, vehicle body materials, paint, sealing materials, soft feeling coating agents, paint coating agents, and air filters.

Advantageous Effects of Invention

The macromolecular material according to the present invention has excellent elongation. In particular, despite being a rigid fluorine material, the macromolecular material according to the present invention exhibits high breaking strain. Because the macromolecular material according to the present invention has an excellent elongation rate, and thus has excellent moldability, the material has a wide range of applications, such as in the material field, including electronic materials, medical components, and chemical feeding tubes, elastic materials, including pipe packing and paint for outdoors, and antifouling coatings.

DESCRIPTION OF EMBODIMENTS

The following describes embodiments of the present invention in detail. In this specification, the tams "comprise" and "contain" include the concepts of "comprise," "contain," "consist essentially of," and "consist of."

The macromolecular material of the present invention may be a material according to, for example, the first embodiment or the second embodiment described below.

The macromolecular material according to the first embodiment comprises a first polymer containing a first structural unit and a second polymer containing a second structural unit. The first structural unit has a guest group in the side chain thereof, and the second structural unit has a host group in the side chain thereof. In particular, at least one of the first polymer and the second polymer of the macromolecular material according to the first embodiment has at least one fluorine group.

The macromolecular material according to the second embodiment comprises a first structural unit having a guest group in the side chain thereof, a second structural unit having a host group in the side chain thereof, and a third structural unit other than the first structural unit and the second structural unit. In particular, at least one structural unit of the first structural unit, the second structural unit, and the third structural unit of the macromolecular material according to the second embodiment has at least one fluorine group.

The macromolecular material according to the present invention (including the macromolecular materials of the first embodiment and the second embodiment) may be hereinafter simply referred to as a "macromolecular material."

The host group and the guest group in the macromolecular material can form a clathrate complex (clathrate compound) through "host-guest interaction." The macromolecular material can involve such host-guest interaction between molecules (or between supermolecules), and due to this interaction, form a crosslinked structure. The crosslinking point in the crosslinked structure is a clathrate complex formed by the host-guest interaction.

The host-guest interaction is reversible. More specifically, occurrence of interaction between the host group and the guest group (and the bond due to the interaction) and dissolution of this interaction (and the dissociation due to the dissolution) are reversible. When the macromolecular material has, for example, at least one fluorine group introduced in the guest group, the macromolecular material can exhibit high breaking strain, becoming a material excellent in elongation rate and flexibility. Additionally, due to the reversible host-guest interaction, the macromolecular material is expected to exhibit self-healing properties.

The following describes specific aspects of the macromolecular material in detail.

Macromolecular Material According to the First Embodiment

The first polymer contains a first structural unit. The first structural unit has a guest group in the side chain of the unit, and functions as the guest group of the first polymer.

The first polymer may have at least one fluorine group. When the first polymer has at least one fluorine group, the position at which the at least one fluorine group bonds is not particularly limited.

The type of the guest group is not particularly limited.

Specific examples of the guest group include a hydrocarbon group and an aromatic aryl group.

In this specification, examples of the hydrocarbon group include alkyl, alkenyl, and alkynyl.

In this specification, unless indicated otherwise, examples of alkyl include linear, branched, cyclic, or basket-shaped $C_{1-20}$ alkyl, such as methyl, ethyl, propyl, isopropyl, butyl, isobutyl, sec-butyl, tert-butyl, pentyl, isopentyl, neopentyl, hexyl, heptyl, octyl, undecyl, dodecyl, tetradecyl, pentadecyl, hexadecyl, heptadecyl, octadecyl, cyclohexyl, and adamantyl.

In this specification, unless indicated otherwise, examples of alkenyl include linear or branched $C_{2-20}$ alkenyl, such as vinyl, 1-propen-1-yl, 2-propen-1-yl, isopropenyl, 2-buten-1-yl, 4-penten-1-yl, and 5-hexen-1-yl.

In this specification, unless indicated otherwise, examples of alkynyl include linear or branched $C_{2-20}$ alkynyl, such as ethynyl, 1-propyn-1-yl, 2-propyn-1-yl, 4-pentyn-1-yl, and 5-hexyne-1-yl.

The guest group may be linear, branched, cyclic, or basket-shaped. When the guest group is, for example, adamantyl, the guest group can have strong host-guest interaction with 1-cyclodextrin described later.

From the standpoint of forming strong host-guest interaction, the guest group preferably has 40 or fewer carbon atoms, and particularly preferably 3 to 20 carbon atoms.

The guest group may have at least one fluorine group. When this is the case, the macromolecular material can be excellent in elongation rate and flexibility.

When the guest group has a fluorine group, specific examples of such a guest group include a hydrocarbon group having at least one fluorine group (preferably, a perfluorohydrocarbon group), a fluoro(poly)ether group, a perfluoro(poly)ether group, —O—(CH$_2$CH$_2$—O)$_n$—Rf (Rf represents a hydrocarbon group having at least one fluorine group; and n is, for example, 1 to 20), and —(CF$_2$)$_n$—CN (n is, for example, 1 to 20).

In this specification, preferable examples of the hydrocarbon group having at least one fluorine group include a perfluorohydrocarbon group.

The "perfluorohydrocarbon group" refers to a hydrocarbon group whose hydrogen atoms bonded to the carbon atoms are all replaced with a fluorine atom.

In this specification, as stated above, the prefix "perfluoro" is interpreted as indicating the typical meaning, and is understood as hydrogen atoms bonded to the carbon atoms all being replaced with a fluorine atom.

In this specification, the prefix "fluoro" is interpreted as indicating the typical meaning, and is understood as at least one of the hydrogen atoms bonded to the carbon atoms being replaced with a fluorine atom.

Specifically, the prefix "fluoro" includes the meaning of the prefix "perfluoro."

The "fluoro(poly)ether group" refers to a group formed by an ether oxygen atom being inserted into at least one carbon-carbon bond of a fluoroalkyl group. When the fluoro(poly)ether group has one ether oxygen atom, the fluoro(poly)ether group is a fluoroether group. When the fluoro(poly)ether group has 2 or more ether oxygen atoms, the fluoro(poly)ether group is a fluoropolyether group.

Just to note, both may be collectively referred to as a fluoro(poly)ether group in this specification.

Likewise, when the perfluoro(poly)ether group has one ether oxygen atom, the perfluoro(poly)ether group is a perfluoroether group. When the perfluoro(poly)ether group has 2 or more ether oxygen atoms, the perfluoro(poly)ether group is a perfluoropolyether group.

Just to note, both may be collectively referred to as a perfluoro(poly)ether group in this specification.

The number of carbon atoms of the hydrocarbon group having at least one fluorine group is not particularly limited, and, for example, preferably 40 or fewer, and more preferably 1 to 20. When the number of carbon atoms falls within these ranges, the guest group is more likely to have host-guest interaction with the host group. Thus, the macromolecular material of the present invention in this aspect has excellent breaking strain. The number of carbon atoms is still more preferably 3 to 20, and particularly preferably 3 to 10.

When the guest group is a hydrocarbon group having at least one fluorine group, the hydrocarbon group may be linear or branched, and preferably linear from the standpoint of the increased likelihood of host-guest interaction. Preferable examples of the guest group include linear alkyl having at least one fluorine group.

When the guest group is a fluoro(poly)ether group, the number of carbon atoms is preferably, for example, 3 to 40. The number of oxygen atoms is preferably, for example, 13 to 30. When the number of carbon atoms and the number of oxygen atoms fall within these ranges, the guest group is more likely to have host-guest interaction with the host group, likely leading to a macromolecular material excellent in breaking strain. Specific examples of the fluoro(poly)ether group and the perfluoro(poly)ether group include those having such a structure that —(CF$_2$CF$_2$CF$_2$—O)$_n$— or —(CF$_2$CF$_2$—O)$_n$(CF$_2$—O)$_m$— (e.g., n and m represents 1 to 20) is present in the repeating structure, and —CF$_2$CF$_3$ or —CF$_3$ is present as the terminal.

When the guest group is a fluoro(poly)ether group, the fluoro(poly)ether group may be linear or branched, and is preferably linear from the standpoint of the further increased likelihood of host-guest interaction.

When the guest group is —(CF$_2$)$_n$—CN, n is, for example, 1 to 20.

The first polymer may have the guest group in its main chain.

The structure of the first structural unit, which is the structural unit that forms the first polymer, is not particularly limited. In other words, the structure of the main chain of the first polymer is not particularly limited. The first structural unit may be represented by, for example, the following formula (1a):

(1a)

wherein Ra represents hydrogen, methyl, or fluorine,
Rb represents hydrogen or fluorine,
Rc represents hydrogen or fluorine,
R$^1$ represents a divalent group famed by removing one hydrogen atom from a monovalent group selected from the group consisting of hydroxyl, thiol, alkoxy optionally having at least one substituent, thioalkoxy optionally having at least one substituent, alkyl optionally having at least one substituent, amino optionally having at least one substituent, amide optionally having at least one substituent, phenyl optionally having at least one substituent, aldehyde, and carboxyl, and/or —O—(CH$_2$—CH$_2$—O)$_n$— (n is 1 to 20), and
R$^G$ represents the guest group.

The first structural unit may be, instead of or in combination with the structural unit represented by formula (1a), a structural unit represented by the following formula (1'a):

(1'a)

wherein Ra, Rb, Rc, and R$^G$ are as defined in formula (1a).

When R$^1$ in formula (1a) is a divalent group formed by removing one hydrogen atom from alkoxy, examples of the alkoxy include C$_{1-10}$ alkoxy. Specific examples include methoxy, ethoxy, propoxy, isopropoxy, butoxy, isobutoxy, sec-butoxy, pentyloxy, and hexyloxy. These alkoxy groups may be linear or branched alkoxy.

When $R^1$ in formula (1a) is a divalent group formed by removing one hydrogen atom from thioalkoxy, examples of the thioalkoxy include $C_{1-10}$ thioalkoxy. Specific examples include methylthio, ethylthio, propylthio, isopropylthio, butylthio, isobutylthio, sec-butylthio, pentylthio, and hexylthio. These thioalkoxy groups may be linear or branched thioalkoxy.

When $R^1$ in formula (1a) is a divalent group formed by removing one hydrogen atom from alkyl, examples of the alkyl include $C_{1-30}$ alkyl. Specific examples include methyl, ethyl, propyl, isopropyl, butyl, isobutyl, sec-butyl, tert-butyl, pentyl, isopentyl, neopentyl, and hexyl. These alkyl groups may be linear or branched alkyl.

When $R^1$ in formula (1a) is a divalent group formed by removing one hydrogen atom from amino optionally having at least one substituent, the nitrogen atom of amino can bond to a carbon atom in the main chain (C—C bond). The substituent, as used herein, refers to, for example, the hydrocarbon group, halogen, or hydroxy group.

When $R^1$ in formula (1a) is amide optionally having at least one substituent, the carbon atom of amide can bond to a carbon atom in the main chain (C—C bond).

When $R^1$ in formula (1a) is phenyl optionally having at least one substituent, the carbon atom at the ortho-, meta-, or para-position with respect to $R^G$ may bond to a carbon atom in the main chain (C—C bond).

When $R^1$ in formula (1a) is aldehyde, the carbon atom of aldehyde can bond to a carbon atom in the main chain (C—C bond).

When $R^1$ in formula (1a) is carboxyl, the carbon atom of carboxyl can bond to a carbon atom in the main chain (C—C bond).

When $R^1$ in formula (1a) is —O—(CH$_2$CH$_2$—O)$_n$—, n is, for example, 1 to 20. In this case, an example of the guest group is a hydrocarbon group having at least one fluorine group, with the number of carbon atoms being, for example, preferably 1 to 10. In this case, the guest group is likely to have host-guest interaction with the host group. Thus, the macromolecular material in this aspect has excellent breaking strain, and tends to have excellent elongation rate and flexibility.

Examples of $R^G$ in formula (1a) are as described for the guest group described above.

The first structural unit may have a structure other than the structures represented by formulas (1a) and (1'a).

For example, the first structural unit may be the structural unit of at least one resin selected from the group consisting of urethane resins, epoxy resins, and polyester resins. Specifically, the first structural unit may have a urethane bond, an epoxy group, or an ester group in the main chain. The first structural unit may have the structure that forms an alkyd resin, a melamine-formaldehyde resin, a polyisocyanate-based resin, a ketone resin, a polyamide-based resin, a polycarbonate-based resin, a polyacetal-based resin, a petroleum resin, or an inorganic resin, such as silica gel or silicic acid.

When the first structural unit has a structure other than structural units represented by formulas (1a) and (1'a), the first structural unit may also have at least one fluorine group.

Examples of the first polymer having the structure as described above include (meth)acrylic-based resins (acrylic-based polymers), polyester-based resins, alkyd resins, polystyrene resins, melamine-formaldehyde resins, polyisocyanate-based resins, polyurethane-based resins, epoxy-based resins, vinyl-chloride-based resins (e.g., vinyl chloride-vinyl acetate copolymers), ketone resins, polyamide-based resins, polycarbonate-based resins, polyacetal-based resins, petroleum resins, polyethylene, polypropylene, and olefin-based resins formed by polymerizing chlorides of these polyolefins; inorganic resins, such as silica gels and silicic acid, elastomers (rubber) having the basic skeleton of these resins, paint, and coating agents.

The first polymer is also preferably a fluorine-based polymer, from the standpoint of lubricity, water repellency, oil repellency, heat resistance, oil resistance, weatherability, antifouling properties, and chemical resistance. Specific examples include fluorine resins, fluorine rubber, fluorine paint, fluorine-containing repellents, and fluorine coating agents, which are obtained by polymerizing a fluoroolefin.

The following describes the second polymer.

The second polymer contains the second structural unit. The second structural unit has the host group in its side chain, and functions as the host group in the second polymer.

The second polymer may have at least one fluorine group. When the second polymer has at least one fluorine group, the position at which the at least one fluorine group bonds is not particularly limited.

The molecule that forms the host group (which may be hereinafter referred to as a "host site") is, for example, at least one member selected from the group consisting of α-cyclodextrin, β-cyclodextrin, γ-cyclodextrin, calix[6]arene sulfonic acid, calix[8]arene sulfonic acid, 12-crown-4, 18-crown-6, [6]paracyclophane, [2,2]paracyclophane, cucurbit[6]uril, and cucurbit[8]uril. These host sites may be substituted. Specifically, the host site may be a derivative of the host site.

The host site is preferably a cyclodextrin or a derivative thereof (in this specification, the term "cyclodextrin" includes those that are chemically derived from cyclodextrins). When the host site is so, the host group of the host polymer and the guest group of the guest polymer become prone to host-guest interaction, leading to improved mechanical physical properties of the resulting macromolecular material, in particular, leading to a macromolecular material having excellent breaking strain, and excellent elongation rate and flexibility. Additionally, the resulting macromolecular material has higher transparency.

The type of the derivative of a cyclodextrin is not particularly limited, and for example, a derivative of a cyclodextrin prepared by a known method may be used as the host site.

When the guest group is alkyl, the host site is preferably α- or β-cyclodextrin, or a derivative thereof. In particular, when the guest group is fluoroalkyl, the host site is preferably γ-cyclodextrin or a derivative thereof. When this is the case, the host group and the guest group become particularly prone to host-guest interaction, leading to excellent breaking strain, and excellent elongation rate and flexibility of the resulting macromolecular material.

The host group may be a group formed by bonding a methylene group (—CH$_2$—) to the oxygen atom derived from hydroxyl of a cyclodextrin or a derivative thereof. When this is the case, the methylene group can bond to the main chain or the side chain of the second structural unit. Specifically, the methylene group can bond to the main chain or the side chain of the second polymer. The methylene group (—CH$_2$—) plays the role of a "linker" between the main chain of the second polymer and the cyclodextrin, which is the host site. This imparts flexibility to the second polymer, thus making it more likely for host-guest interaction to occur. This further leads to high breaking strain of the resulting macromolecular material, and excellent elongation rate and flexibility of the material.

The methylene group can bond to the side chain of the second polymer. For example, when the structural unit of the second polymer is represented by formula (2a) described below, a methylene group can bond to $R^2$ in formula (2a). More specifically, when the side chain of the second polymer has an ester group, a methylene group can bond to the oxygen atom of the ester group. When the side chain of the second polymer has an amide group, a methylene group can bond to the nitrogen atom of the amide group. A methylene group may also bond to a carbon atom of the C—C bond in the main chain.

The second polymer may have the host group in its main chain.

The structure of the second structural unit, which is the structural unit that forms the second polymer, is not particularly limited. In other words, the structure of the main chain of the second polymer is not particularly limited. The second structural unit may have, for example, a structural unit represented by the following formula (2a):

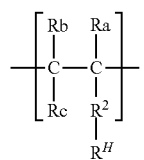

(2a)

wherein Ra represents hydrogen, methyl, or fluorine, Rb represents hydrogen or fluorine, Rc represents hydrogen or fluorine, $R^2$ represents a divalent group formed by removing one hydrogen atom from a monovalent group selected from the group consisting of hydroxyl, thiol, alkoxy optionally having at least one substituent, thioalkoxy optionally having at least one substituent, alkyl optionally having at least one substituent, amino optionally having at least one substituent, amide optionally having at least one substituent, aldehyde, and carboxyl, or —C(O)NH—(CH$_2$)$_n$—O—C(O)— (n is 2 to 8), and $R^H$ represents a host group.

When $R^2$ in formula (2a) is a divalent group formed by removing one hydrogen atom from alkoxy, examples of the alkoxy include $C_{1-10}$ alkoxy. Specific examples include methoxy, ethoxy, propoxy, isopropoxy, butoxy, isobutoxy, sec-butoxy, pentyloxy, and hexyloxy, and these groups may be linear or branched.

When $R^2$ in formula (2a) is a divalent group formed by removing one hydrogen atom from thioalkoxy, examples of the thioalkoxy include $C_{1-10}$ thioalkoxy. Specific examples include methylthio, ethylthio, propylthio, isopropylthio, butylthio, isobutylthio, sec-butylthio, pentylthio, and hexylthio, and these groups may be linear or branched.

When $R^2$ in formula (2a) is a divalent group formed by removing one hydrogen atom from alkyl, examples of the alkyl include $C_{1-30}$ alkyl. Specific examples include methyl, ethyl, propyl, isopropyl, butyl, isobutyl, sec-butyl, tert-butyl, pentyl, isopentyl, neopentyl, and hexyl. These groups may be linear or branched.

When $R^2$ in formula (2a) is a divalent group famed by removing one hydrogen atom from amino optionally having at least one substituent, the nitrogen atom of the amino can bond to a carbon atom of the main chain (C—C bond).

When $R^2$ in formula (2a) is amide optionally having at least one substituent, the carbon atom of the amide can bond to a carbon atom of the main chain (C—C bond).

When $R^2$ in formula (2a) is aldehyde, the carbon atom of the aldehyde can bond to a carbon atom of the main chain (C—C bond).

When $R^2$ in formula (2a) is carboxyl, the carbon atom of the carboxyl can bond to a carbon atom of the main chain (C—C bond).

Examples of $R^H$ in formula (2a) are host groups as described above.

$R^2$ in formula (2a) is preferably a divalent group formed by removing one hydrogen atom from a monovalent group selected from the group consisting of amide and carboxyl. Specifically, the structural unit represented by formula (2a) preferably has, in its side chain, at least one of amide whose hydrogen is replaced with $R^H$ and carboxyl whose hydrogen is replaced with $R^H$. When the structural unit represented by formula (2a) is so, the macromolecular material of the present invention can be easily prepared.

The second structural unit may have a structure other than the structure represented by formula (2a).

For example, the second structural unit may be the structural unit of at least one resin selected from the group consisting of urethane resins, epoxy resins, and polyester resins. Specifically, the second structural unit may have a urethane bond, an epoxy group, or an ester group in its main chain. The first structural unit may have the structure that forms an alkyd resin, a melamine-formaldehyde resin, a polyisocyanate-based resin, a ketone resin, a polyamide-based resin, a polycarbonate-based resin, a polyacetal-based resin, a petroleum resin, or an inorganic resin, such as silica gel or silicic acid.

When the second structural unit has a structure other than the structural unit represented by formula (2a), the second structural unit may have at least one fluorine group.

Examples of the second polymer having the structure as described above include (meth)acrylic-based resins (acrylic-based polymers), polyester-based resins, alkyd resins, polystyrene resins, melamine-formaldehyde resins, polyisocyanate-based resins, polyurethane-based resins, epoxy-based resins, vinyl chloride-based resins (e.g., vinyl chloride-vinyl acetate copolymers), ketone resins, polyamide-based resins, polycarbonate-based resins, polyacetal-based resins, petroleum resins, polyethylene, polypropylene, and olefin-based resins formed by polymerizing chlorides of these polyolefins; inorganic resins, such as silica gel and silicic acid, elastomers (rubber) having the basic skeleton of these resins, paint, and coating agents.

The second polymer is also preferably a fluorine-based polymer, from the standpoint of lubricity, water repellency, oil repellency, heat resistance, oil resistance, weatherability, antifouling properties, and chemical resistance. Specific examples include fluorine resins, fluorine rubber, fluorine paint, fluorine-containing repellents, and fluorine coating agents, which are obtained by polymerizing a fluoroolefin.

The first polymer and the second polymer respectively contain the first structural unit and the second structural unit, and these polymers may further contain other structural units.

For example, the first polymer may contain the second structural unit in addition to the first structural unit. The second polymer may contain the first structural unit in addition to the second structural unit.

Additionally, the first polymer and the second polymer may each contain a structural unit other than the first structural unit and the second structural unit as long as the first polymer and the second polymer can have host-guest interaction. An example of such other structural units is a structural unit copolymerizable with the first structural unit and the second structural unit (which is hereinafter referred to as the "third structural unit").

The third structural unit may have, for example, a structural unit represented by the following formula (3a):

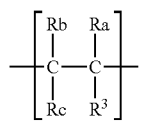

wherein Ra represents hydrogen, methyl, or fluorine, Rb represents hydrogen or fluorine, Rc represents hydrogen or fluorine, and $R^3$ represents fluorine, chlorine, bromine, iodine, hydroxyl, thiol, amino optionally having at least one substituent, carboxyl optionally having one substituent, or amide optionally having at least one substituent.

When $R^3$ in formula (3a) is carboxyl having one substituent, such carboxyl includes carboxyl whose hydrogen atom is replaced with alkyl (e.g., methyl and ethyl), or hydroxyalkyl (e.g., hydroxymethyl and hydroxyethyl).

When $R^3$ in formula (3a) is amide having at least one substituent (i.e., secondary amide or tertiary amide), such amide includes amide formed by replacing one hydrogen atom or two hydrogen atoms of a primary amide with alkyl (e.g., methyl and ethyl) or hydroxyalkyl (e.g., hydroxymethyl and hydroxyethyl).

$R^3$ in formula (3a) is preferably amino; amide; amide whose hydrogen atom is replaced with alkyl, hydroxyl, or alkoxyl; carboxyl; and carboxyl whose hydrogen atom is replaced with alkyl, hydroxyalkyl (e.g., hydroxyethyl), or alkoxyl.

Ra, Rb, and Rc in formulas (1a), (2a), and (3a) may be identical to or different from each other.

The third structural unit may have a structure derived from, for example, the "third polymerizable monomer" described below (i.e., a polymerizable monomer capable of forming the third structural unit by polymerization).

When the first polymer contains the second structural unit and/or the third structural unit in addition to the first structural unit, the order of the sequence of these structural units is not restricted. For example, these structural units may be arranged at random. If the sequence is arranged at random, the first polymer is a "random copolymer." The first polymer may be a block copolymer or an alternating copolymer.

Likewise, when the second polymer contains the first structural unit and/or the third structural unit in addition to the second structural unit, the order of the sequence of these structural units is not restricted. For example, these structural units may be arranged at random. If the sequence is arranged at random, the second polymer is a "random copolymer." The second polymer may also be a block copolymer or an alternating copolymer.

The number of structural units of the first polymer and the second polymer is not particularly limited. The number of structural units of each polymer is, for example, 10000 to 300000.

The macromolecular material according to the first embodiment contains the first polymer and the second polymer. For example, the macromolecular material according to the first embodiment is formed by host-guest interaction between the first polymer and the second polymer. As long as the effects of the present invention are not impaired, the macromolecular material according to the first embodiment may contain other polymer(s) in addition to the first polymer and the second polymer. This other polymer(s) may be physically mixed with the first polymer and the second polymer. In this case, the macromolecular material becomes a polymer blend.

Macromolecular Material According to the Second Embodiment

The macromolecular material according to the second embodiment contains the first structural unit, the second structural unit, and the third structural unit that are the same as those of the macromolecular material according to the first embodiment. Of the first, second, and third structural units, at least one structural unit has at least one fluorine group.

In particular, the macromolecular material according to the second embodiment contains the first structural unit, the second structural unit, and the third structural unit per molecule. The aspect of each of the first, second, and third structural units may be the same as the aspect of the first, second, and third structural units of the macromolecular material according to the first embodiment.

The macromolecular material according to the second embodiment has, for example, host-guest interaction formed between molecules.

The macromolecular material according to the second embodiment may be a random copolymer, a block copolymer, an alternating copolymer, or the like, and the order of the sequence of the structural units is not particularly limited.

Other Features of Macromolecular Material

The macromolecular material of the present invention preferably contains 4 or more fluorine groups in total in the first structural unit and the second structural unit. When this is the case, the macromolecular material can have processability, flexibility, elongation, impact resistance, and toughness, while maintaining lubricity, water repellency, oil repellency, heat resistance, oil resistance, weatherability, antifouling properties, and chemical resistance.

The macromolecular material preferably contains 40 or fewer, and particularly preferably 6 or more and 30 or fewer fluorine groups in total in the first structural unit and the second structural unit. The second structural unit preferably contains 10 or fewer fluorine groups, or may contain no fluorine group.

When the macromolecular material contains the first structural unit, the second structural unit, and the third structural unit, the content of each structural unit is not particularly limited.

For example, the first structural unit may be present in an amount of 0.01 to 30 mol %, and the second structural unit may be present in an amount of 0.01 to 30 mol % of the total number of moles of the first structural unit, the second structural unit, and the third structural unit. When the content of the structural units is so, the host group and the guest group become prone to interaction, leading to high breaking strain of the resulting macromolecular material, and excellent elongation rate and flexibility of the material. Of the total number of moles of the first structural unit, the second structural unit, and the third structural unit, the first structural unit is preferably present in an amount of 0.1 to 10 mol %, and the second structural unit is preferably present in an amount of 0.1 to 10 mol %; and the first structural unit is more preferably present in an amount of 0.5 to 3 mol %, and the second structural unit is more preferably present in an amount of 0.5 to 3 mol %. The first structural unit and the second structural unit each are particularly preferably present in an amount of 0.5 to 2 mol % of the number of moles of all of the structural units.

The macromolecular material according to the present invention may further contain other additives as long as the effects of the present invention are not impaired. Examples of other additives include antioxidants, UV absorbers, photostabilizers, fillers, and electrolytes.

The macromolecular material according to the present invention may be subjected to chemical treatment after polymerization to modify the macromolecular material, as long as the effects of the present invention are not impaired. For example, when a macromolecular material synthesized by using vinyl acetate as the third polymerizable monomer is subjected to treatment with a base, such as sodium hydroxide, vinyl acetate-derived acetyl groups are deprotected, thus modifying the material into a polyvinyl alcohol having host-guest interaction. Additionally, for example, adding a crosslinking agent to a macromolecular material in the form of raw rubber, and heating (vulcanizing) it can modify the macromolecular material having host-guest interaction. This modified macromolecular material is an elastomer (rubber).

The macromolecular material according to the present invention may further contain other polymer compound(s). For example, the macromolecular material according to the present invention can be physically included in another polymer compound for the purpose of improving the mechanical and chemical properties of the other polymer compound. Examples of other polymer compounds include (meth)acrylic-based resins (acrylic-based polymers), polyester-based resins, alkyd resins, polystyrene resins, melamine-formaldehyde resins, polyisocyanate-based resins, epoxy-based resins, vinyl chloride-based resins (e.g., vinyl chloride-vinyl acetate copolymers), ketone resins, petroleum resins, organic resins, such as polyethylene, polypropylene, and chlorides of these polyolefins; inorganic resins, such as silica gel and silicic acid; those formed by polymerizing fluoroolefins, such as fluorine resins, fluorine rubber, fluorine paint, fluorine-containing repellents, and fluorine coating agents.

The macromolecular material according to the present invention has crosslinking points due to host-guest interaction, and may also have crosslinking points formed by covalent bonds, as long as the effects of the present invention are not impaired. Such crosslinking points by covalent bonds can be formed by using a known crosslinking agent.

The form of the macromolecular material according to the present invention is not particularly limited. For example, the macromolecular material may be in the form of a macromolecular gel containing a solvent.

When the macromolecular material is a macromolecular gel, the type of solvent is not particularly limited. Examples of the solvent include, in addition to water, organic solvents, such as alcohols.

The solvent may be one type of solvent or a mixture of two or more solvents. The content of the solvent in the macromolecular gel is not particularly limited. The content of the solvent is more preferably 50 parts by mass or more, and particularly preferably 60 parts by mass or more, per 100 parts by mass of the crosslinked structure. The content of the solvent is more preferably 150 parts by mass or less, and particularly preferably 99 parts by mass or less, based on the total amount of the crosslinked structure.

The macromolecular material may also be in the form of a xerogel. Specifically, the macromolecular material may be a dry form of a macromolecular gel.

The shape of the macromolecular material is not particularly limited, and the macromolecular material can be formed into, for example, a sheet, a film, or a plate.

The macromolecular material contains the first structural unit containing a guest group and the second structural unit containing a host group, as the structural units.

The host-guest interaction between these groups forms a crosslinked structure. The point at which host-guest interaction occurs in this crosslinked structure serves as a crosslinking point. Thus, among such crosslinking points in the crosslinked structure, clathrate complexes formed by the interaction between the host group and the guest group are present.

The host-guest interaction can occur, for example, due to the hydrophobic interaction, hydrogen bond, van der Waals force, electrostatic interaction, coordinate bond, or n-electron interaction between the host group and the guest group; however, there is no limitation to these.

The macromolecular material according to the present invention is excellent in breaking strain, and excellent in elongation rate and flexibility. Due to the excellent elongation rate, the macromolecular material is also excellent in moldability, thus having a range of applications in the material industry, such as in electronic materials and medical components.

In particular, due to the presence of one or more fluorine groups and the intermolecularly occurring host-guest interaction, the macromolecular material according to the present invention is improved in the drawbacks of conventional macromolecular materials, exhibiting excellent processability, flexibility, elongation, impact resistance, and toughness, while maintaining lubricity, water repellency, oil repellency, heat resistance, oil resistance, weatherability, antifouling properties, and chemical resistance.

Thus, the macromolecular material according to the present invention is suitable for a range of applications, such as (1) coating films for protecting glass, mobile data terminal displays, touchscreens, flexible panels, etc., from scratches or stains; (2) vehicle body materials that have excellent mechanical strength; (3) coating films for protecting bodies and interiors of vehicles from scratches or stains; (4) paint for imparting weatherability, chemical resistance, solvent durability, scratch resistance, and/or anti-corrosion properties to substrates (e.g., steel plates and wood) by forming a coating film on the substrates; (5) sealing materials for imparting excellent elongation, strength, and abrasion resistance; (6) soft feeling coating agents for forming a coating film on a substrate to improve the texture; (7) paint coating agents for imparting sound insulation and/or vibration suppression; and (8) stretchable air filters.

Method for Producing Macromolecular Material According to First Embodiment

The method for producing the macromolecular material according to the first embodiment is not particularly limited. Examples of the method for producing the macromolecular material according to the first embodiment include a method in which the first polymer and the second polymer are separately prepared, and these polymers are mixed to obtain the macromolecular material according to the first embodiment; and a method in which the first polymer and the second polymer are prepared in a single reaction system to obtain the macromolecular material according to the first embodiment.

The method for preparing the first polymer is not particularly limited. For example, the first polymer can be obtained by polymerizing only a polymerizable monomer capable of forming the first structural unit by polymerization (which may be hereinafter referred to as the "first polymerizable monomer").

Alternatively, the first polymer can be obtained by copolymerizing a mixture containing the first polymerizable monomer and another polymerizable monomer. The other polymerizable monomer (i.e., a polymerizable monomer other than the first polymerizable monomer) includes the second polymerizable monomer described later, the third polymerizable monomer (a polymerizable monomer other than the first and second polymerizable monomers) described later, and a mixture of these monomers.

The method for producing the second polymer is not particularly limited. For example, the second polymer can be obtained by polymerizing only a polymerizable monomer capable of forming the second structural unit by polymerization (which may be hereinafter referred to as the "second polymerizable monomer"). Alternatively, the second polymer can be obtained by copolymerizing a mixture containing the second polymerizable monomer and another polymerizable monomer. The other polymerizable monomer (i.e., a polymerizable monomer other than the second polymerizable monomer) includes the first polymerizable monomer, the third polymerizable monomer, and a mixture of these monomers.

For the first polymerizable monomer, for example, a range of polymerizable monomers capable of forming the structure represented by formula (1a) as the first structural unit can be used. An example is a polymerizable monomer represented by the following formula (1b) (which is hereinafter referred to as "monomer (1)").

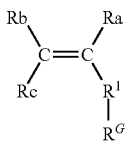

(1b)

wherein Ra, Rb, Rc, $R^1$, and $R^G$ are as defined for Ra, Rb, Rc, and $R^G$ in formula (1a).

Monomer (1) can be purchased (a commercially available reagent), or can be produced in accordance with a known method or a method similar to a known method.

Specific examples of monomer (1) include fluorine-containing conjugated or non-conjugated olefins, and fluorine-free conjugated olefins.

Examples of fluorine-containing conjugated or non-conjugated olefins include (perfluoromethyl)methyl (meth)acrylate, (perfluoroethyl)methyl (meth)acrylate, (perfluorobutyl)ethyl (meth)acrylate, (perfluorohexyl)ethyl (meth)acrylate, (perfluoroheptyl)methyl (meth)acrylate, (perfluorodecyl)methyl (meth)acrylate, perfluoro(methyl vinyl ether), perfluoro(ethyl vinyl ether), perfluoro(propyl vinyl ether), perfluoro(butyl vinyl ether), perfluoro(pentyl vinyl ether), perfluoro(hexyl vinyl ether), methyl α-fluoroacrylate, ethyl α-fluoroacrylate, propyl α-fluoroacrylate, butyl α-fluoroacrylate, pentyl α-fluoroacrylate, and hexyl α-fluoroacrylate. In this specification, (meth)acrylic refers to either acrylic or methacrylic.

Examples of fluorine-free conjugated olefins include methyl (meth)acrylate, ethyl (meth)acrylate, n-propyl (meth)acrylate, isopropyl (meth)acrylate, n-butyl (meth)acrylate, isobutyl (meth)acrylate, 2-ethylhexyl (meth)acrylate, cyclohexyl (meth)acrylate, adamantyl (meth)acrylate, methyl (meth)acrylamide, ethyl (meth)acrylamide, n-propyl (meth)acrylamide, isopropyl (meth)acrylamide, n-butyl (meth)acrylamide, isobutyl (meth)acrylamide, 2-ethylhexyl (meth)acrylamide, cyclohexyl (meth)acrylamide, and adamantyl (meth)acrylamide.

The first polymerizable monomer may be a monomer other than monomer (1). For example, the first polymerizable monomer may be a polymerizable monomer that has a structure of formula (1b) in which, however, $R^1$ is absent, and $R^G$ directly bonds to the carbon atom of the C=C bond (which is hereinafter referred to as monomer (1')). Monomer (1') is a monomer for forming the first structural unit that has the structure represented by formula (1a'). Examples of monomer (1') include fluorine-containing monomers, such as (perfluoromethyl)ethylene, (perfluoroethyl)ethylene, (perfluoropropyl)ethylene, (perfluorobutyl)ethylene, (perfluoropentyl)ethylene, (perfluorohexyl)ethylene, hexafluoropropylene (HFP), hexafluoroisobutene, 1,1,2-trifluoropropylene, trifluorostyrene, perfluoro(1-butene), perfluoro(1-pentene), perfluoro(1-hexene), perfluoro(1-heptene), and perfluoro(1-octene).

The first polymerizable monomer may also be a fluorine-free, non-conjugated olefin.

Examples of non-conjugated olefins include aliphatic vinyl monomers, hydroxy-containing vinyl ether monomers, and carboxy-containing monomers.

Examples of aliphatic vinyl monomers include vinyl acetate, vinyl propionate, vinyl butanoate, vinyl pentanoate, vinyl caproate, vinyl caprate, vinyl laurate, and vinyl versate. In particular, examples include vinyl acetate, vinyl pivalate, monochloro vinyl acetate, vinyl benzoate, alkyl vinyl ethers, such as methyl vinyl ether, and ethyl vinyl ether, and non-fluorine-based olefins, such as ethylene, propylene, n-butene, and isobutene.

Examples of hydroxy-containing vinyl ether monomers include 2-hydroxyethyl vinyl ether, 3-hydroxypropyl vinyl ether, 2-hydroxypropyl vinyl ether, 2-hydroxy-2-methylpropyl vinyl ether, 4-hydroxybutyl vinyl ether, 4-hydroxy-2-methylbutyl vinyl ether, 5-hydroxypentyl vinyl ether, 6-hydroxyhexyl vinyl ether, 2-hydroxyethyl allyl ether, 4-hydroxybutyl allyl ether, and glycerol monoallyl ether.

Examples of carboxy-containing monomers include undecylenic acid, pentenoic acid, hexenoic acid, heptenoic acid, octenoic acid, nonenoic acid, decenoic acid, dodecenoic acid, tridecenoic acid, tetradecenoic acid, pentadecenoic acid, hexadecenoic acid, heptadecenoic acid, octadecenoic acid, nonadecenoic acid, eicosenoic acid, acrylic acid, methacrylic acid, vinyl acetate, crotonic acid, cinnamic acid, 3-allyloxypropionic acid, itaconic acid, itaconic acid monoester, maleic acid, maleic acid monoester, maleic anhydride, fumaric acid, fumaric acid monoester, vinyl phthalate, and vinyl pyromellitate. Of these, undecylenic acid is more preferable from the standpoint of good reactivity and inexpensive prices.

For the second polymerizable monomer, for example, a range of polymerizable monomers capable of forming the structure represented by formula (2a) as the second structural unit can be used. An example is a polymerizable monomer represented by the following formula (2b) (which is hereinafter referred to as "monomer (2)").

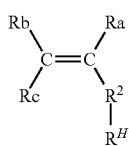

(2b)

wherein Ra, Rb, Rc, $R^2$ and $R^H$ are as defined for Ra, Rb, Rc, $R^2$ and $R^H$ in formula (2a).

The second polymerizable monomer is, for example, preferably a derivative of (meth)acrylic acid ester, a derivative of (meth)acrylamide, a derivative of vinyl ether, a derivative of vinyl ester, a derivative of epoxy, and a derivative of isocyanate.

Specific examples of the second polymerizable monomer include 6-(meth)acrylamide-α-cyclodextrin, 6-(meth)acrylamide-β-cyclodextrin, 6-(meth)acrylamide-γ-cyclodextrin, α-cyclodextrin (meth)acrylate, β-cyclodextrin (meth)acrylate, γ-cyclodextrin (meth)acrylate, 6-(meth)acrylamide methyl-γ-cyclodextrin, α-cyclodextrin ethyl vinyl ether (6-(vinyloxyethyl)-α-cyclodextrin), β-cyclodextrin ethyl vinyl ether, γ-cyclodextrin ethyl vinyl ether, N-(vinyloxyethyl)-6-amino-α-cyclodextrin, N-(vinyloxyethyl)-6-amino-β-cyclodextrin, and N-(vinyloxyethyl)-6-amino-γ-cyclodextrin. Just to note, these listed compounds are not necessarily described by their formal names, and described by names for convenience. For example, 6-(meth)acrylamide-α-cyclodextrin indicates a compound formed by substituting α-cyclodextrin with (meth)acrylamide at the sixth position.

The second polymerizable monomer is not limited to the compounds listed above. The second polymerizable monomer may be an isomer of these compounds, or a compound formed by partly or entirely modifying these compounds with other substituent(s).

The second polymerizable monomer can be produced by a known method.

The third polymerizable monomer is not particularly limited in the structure, as long as the third polymerizable monomer is a monomer other than the first polymerizable monomer and the second polymerizable monomer, and is copolymerizable with the first polymerizable monomer and the second polymerizable monomer.

In particular, when the first polymerizable monomer and the second polymerizable monomer contain polymerizable unsaturated bonds, this copolymerizable, third polymerizable monomer also preferably contains polymerizable unsaturated bonds. Examples of such a third polymerizable monomer include the following monomers 1) to 3).

1) Conjugated Olefin

The conjugated olefin is, for example, at least one member selected from the group consisting of acrylamide represented by $CH_2=CHCO-NR_{11}R_{21}$, methacrylamide represented by $CH_2=CCH_3CO-NR_{11}R_{22}$ ($R_{11}$ and $R_{21}$ are identical or different, and represent hydrogen or linear, branched, or cyclic $C_{1-20}$ alkyl), acrylic acid ester represented by $CH_2=CHCO-O-R_{31}$, methacrylic acid ester represented by $CH_2=CCH_3CO-O-R_{31}$ ($R_{31}$ represents linear, branched, or cyclic $C_{1-20}$ alkyl), α-fluoroacrylic acid ester represented by $CH_2=CFCO-O-R_{41}$ ($R_{41}$ represents linear, branched, or cyclic $C_{1-20}$ alkyl), (meth)acrylic acid, α-fluoroacrylic acid, acetonitrile, N-hydroxymethyl (meth)acrylamide, N-hydroxymethyl (meth)acrylamide, 2-hydroxymethyl (meth)acrylate, and 2-hydroxyethyl (meth)acrylate.

2) Non-Conjugated Olefin

The non-conjugated olefin is, for example, at least one member selected from the group consisting of alkyl vinyl ether represented by $CH_2=CH-O-R_{12}$, vinyl carboxylate represented by $CH_2=CH-O-CO-R_{12}$ ($R_{12}$ represents linear, branched, or cyclic $C_{1-20}$ alkyl), terminal olefin represented by $CH_2=CH-R_{22}$ ($R_{22}$ represents linear, branched, or cyclic $C_{1-20}$ alkyl), hydroxyalkyl vinyl ether represented by $CH_2=CHR_{32}$ ($R_{32}$ represents $-OR_{42}$ or $-CH_2OR_{42}$, $R_{42}$ represents hydroxy-containing alkyl), hydroxyalkyl allyl ether, a carboxy-containing vinyl monomer represented by the following formula (4)

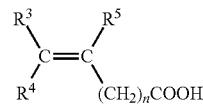

(4)

wherein $R^3$, $R^4$ and $R^5$ may be identical or different and each represent hydrogen, alkyl, carboxyl, or ester, and n represents an integer of 0 to 20, a carboxy-containing vinyl monomer represented by the following formula (5)

(5)

wherein $R^6$ and $R^7$ may be identical or different and each represent saturated or unsaturated, linear or cyclic alkyl, n is 0 or 1, and m is 0 or 1, ethylene, propylene, halogenated ethylene, such as vinyl chloride, butadiene, styrene, substituted styrene, and vinyl pyrrolidone.

3) Fluorine-Containing Olefin

The fluorine-containing olefin is, for example, at least one member selected from the group consisting of tetrafluoroethylene (TFE), hexafluoropropylene (HFP), vinylidene fluoride (VdF), vinyl fluoride (VF), chlorotrifluoroethylene (CTFE), hexafluoroisobutene, 1,1,2-trifluoropropylene, trifluoroethylene, trifluorostyrene, perfluoro(allyl vinyl ether), perfluoro(butenyl vinyl ether), and perfluoroalkyl vinyl ether (PAVE) represented by the following formula (6)

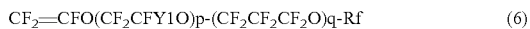

(6)

wherein Yl represents F or $CF_3$, Rf represents $C_{1-5}$ perfluoroalkyl, p is an integer of 0 to 5, and q is an integer of 0 to 5.

Alternatively, the third polymerizable monomer may be, for example, fluorine-containing compound (A) disclosed in WO2015/046569.

The third polymerizable monomer may also be a compound represented by the following formula (3b)

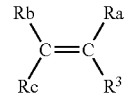

(3b)

wherein Ra, Rb, Rc, and $R^3$ are as defined for Ra, Rb, Rc, and $R^3$ in formula (3a). The third polymerizable monomer represented by formula (3b) is hereinafter referred to as "monomer (3)."

Specific examples of monomer (3) include fluorine-free conjugated olefins, fluorine-free non-conjugated olefins, and fluorine-containing olefins.

Examples of fluorine-free conjugated olefins include methyl (meth)acrylate, ethyl (meth)acrylate, n-propyl (meth)acrylate, isopropyl (meth)acrylate, n-butyl (meth)acrylate, isobutyl (meth)acrylate, n-pentyl (meth)acrylate, n-hexyl (meth)acrylate, 2-ethylhexyl (meth)acrylate, cyclohexyl (meth)acrylate, methyl α-fluoroacrylate, α-fluoroacrylic acid, acetonitrile, (meth)acrylic acid, (meth)acrylamide, methyl (meth)acrylate, ethyl (meth)acrylate, N,N-dimethyl acrylamide, N-isopropyl (meth)acrylamide, N-hydroxymethyl (meth)acrylamide, N-hydroxyethyl (meth)acrylamide, 2-hydroxymethyl (meth)acrylate, 2-hydroxyethyl (meth)acrylate, 2-fluoroacrylic acid, and methyl 2-fluoroacrylate.

Examples of fluorine-free non-conjugated olefins include hydroxy-containing vinyl ethers and carboxy-containing monomers.

Examples of hydroxy-containing vinyl ethers include 2-hydroxyethyl vinyl ether, 3-hydroxypropyl vinyl ether, 2-hydroxypropyl vinyl ether, 2-hydroxy-2-methyl propyl vinyl ether, 4-hydroxy butyl vinyl ether, 4-hydroxy-2-methyl butyl vinyl ether, 5-hydroxy pentyl vinyl ether, 6-hydroxy hexyl vinyl ether, 2-hydroxyethyl allyl ether, 4-hydroxy butyl allyl ether, and glycerol monoallyl ether. Of these, 4-hydroxy butyl vinyl ether and 2-hydroxyethyl vinyl ether are preferable.

Examples of carboxy-containing monomers include undecylenic acid, pentenoic acid, hexenoic acid, heptenoic acid, octenoic acid, nonenoic acid, decenoic acid, dodecenoic acid, tridecenoic acid, tetradecenoic acid, pentadecenoic acid, hexadecenoic acid, heptadecenoic acid, octadecenoic acid, nonadecenoic acid, eicosenoic acid, acrylic acid, methacrylic acid, vinyl acetate, crotonic acid, cinnamic acid, 3-allyloxypropionic acid, itaconic acid, itaconic acid monoester, maleic acid, maleic acid monoester, maleic anhydride, fumaric acid, fumaric acid monoester, vinyl phthalate, and vinyl pyromellitate. Of these, undecylenic acid is more preferable from the standpoint of good reactivity and inexpensive prices.

Other examples of the third polymerizable monomer include ethylene, propylene, halogenated ethylene, such as vinyl chloride, butadiene, styrene, substituted styrene, and vinyl pyrrolidone.

The first polymerizable monomer, the second polymerizable monomer, and the third polymerizable monomer each may be a single monomer, or a combination of two or more monomers.

The method for polymerizing the macromolecular material is not particularly limited. For example, radical polymerization, addition polymerization, polycondensation, or addition condensation may be used.

The macromolecular material can be prepared, for example, by a production method including the step of mixing the first polymerizable monomer and the second polymerizable monomer to prepare a mixture and the step of heating the mixture. The former step and the latter step may be respectively referred to as the "mixing step" and the "heating step" below.

In the mixing step, the first polymerizable monomer, the second polymerizable monomer, the optional third polymerizable monomer, and the optional other polymerizable monomer are mixed, thereby preparing a mixture of polymerizable monomers. The mixing method is not particularly limited.

A solvent may optionally be added when preparing the mixture. Examples of this solvent include water, and aqueous solvents such as alcohols. Organic solvents, and fluorine-based solvents may also be used. This solvent also functions as a polymerization solvent for polymerization reaction in the step performed later.

In the heating step, the mixture prepared in the mixing step is heated. The heating temperature is, for example, typically 30 to 100° C., preferably 60 to 100° C., and more preferably 90 to 100° C.

In the heating step, the temperature within the ranges described above may be maintained, for example, typically for 30 minutes to 24 hours, preferably for 1 to 5 hours, and more preferably for 1 to 3 hours.

Heating the mixture in the manner described above can cause host-guest interaction between the polymerizable monomer having host groups (second polymerizable monomer) and the polymerizable monomer having guest groups (first polymerizable monomer). This interaction can form a clathrate complex of the first polymerizable monomer and the second polymerizable monomer. The formation of such a clathrate complex is likely to give the mixture as a homogeneous solution or dispersion, thus facilitating the polymerization performed later, and likely causing homogeneous host-guest interaction across the entire macromolecular material. The obtained macromolecular material is thus excellent in breaking strain, and excellent in elongation rate and flexibility.

The polymerizable monomer other than the first polymerizable monomer and the second polymerizable monomer may be added, for example, in the mixing step, before heating in the heating step, during heating in the heating step, or after completion of the heating step.

After the heating step, the step of performing a reaction to polymerize the mixture may be added. This allows polymerization reaction of the mixture to proceed. After the heating step, the mixture may be cooled to a predetermined temperature (e.g., the heating temperature in the heating step or less, specifically 0 to 60° C.) before performing the polymerization reaction. Alternatively, after the heating step, the mixture may be subjected to a polymerization reaction without being cooled.

When the polymerizable monomers for use contains the first polymerizable monomer, the second polymerizable monomer, and the third polymerizable monomer, the content of each monomer can be suitably determined according to the target properties of the resulting macromolecular material. For example, the content of the first polymerizable monomer may be 0.01 to 30 mol %, and the content of the second polymerizable monomer may be 0.01 to 30 mol % of the total amount of the polymerizable monomers. The content of the first polymerizable monomer is preferably 0.1 to 10 mol %, and the content of the second polymerizable monomer is preferably 0.1 to 10 mol % of the total amount of the polymerizable monomers. The content of the first polymerizable monomer is preferably 0.5 to 3 mol %, and the content of the second polymerizable monomer is preferably 0.5 to 3 mol % of the total amount of the polymerizable monomers. The content of the first polymerizable monomer and the content of the second polymerizable monomer are each particularly preferably 0.5 to 2 mol % of the total number of moles of the polymerizable monomers.

The polymerization reaction of the polymerizable monomers may be performed in the presence of a polymerization initiator in an aqueous vehicle, in particular, water. When a polymerization reaction is performed in this manner, the resulting macromolecular material becomes a macromolecular gel that contains water as a solvent. The aqueous vehicle may be a mixture solvent of water and another solvent, as long as the preparation of the macromolecular material is not hindered. Examples of the other solvent include hydrophilic solvents that have a higher boiling point than water, and organic solvents that are compatible with water, such as lower alcohols. When a fluorine-containing polymerizable monomer is used, a fluorine-based solvent, such as hexafluoroisopropyl alcohol, pentafluoropropyl alcohol, or meta-xylene hexafluoride, may be used in consideration of compatibility.

Examples of the polymerization initiator for use in the polymerization reaction of the polymerizable monomers include persulfates, such as ammonium persulfate and potassium persulfate (reducing agents, such as sodium hydrogen sulfite, sodium pyrosulfite, cobalt naphthenate, and dimethyl aniline, are also optionally usable); redox initiators composed of an oxidant (e.g., ammonium peroxide, and potassium peroxide), a reducing agent (e.g., sodium sulfite), and a transition metal salt (e.g., iron sulfate); diacyl peroxides, such as acetyl peroxide, and benzoyl peroxide; dialkoxycarbonyl peroxides, such as isopropoxycarbonyl peroxide, and tert-butoxycarbonyl peroxide;

ketone peroxides, such as methyl ethyl ketone peroxide, and cyclohexanone peroxide; hydroperoxides, such as hydrogen peroxide, tert-butyl hydroperoxide, and cumene hydroperoxide; dialkyl peroxides, such as di-tert-butyl peroxide, and dicumyl peroxide; alkyl peroxy esters, such as tert-butylperoxy acetate, and tert-butylperoxy pyvarate; azo compounds, such as 2,2'-azobisisobutyronitrile, 2,2'-azobis(2,4-dimethylvaleronitrile), 2,2'-azobis(2-methylvaleronitrile), 2,2'-azobis(2-cyclopropyl propionitrile), 2,2'-azobisisobutyric dimethyl, 2,2'-azobis[2-(hydroxymethyl)propionitrile], 4,4'-azobis(4-cyanopentenoic acid), 2,2'-azobis[2-(2-imidazolin-2-yl)propane]dihydrochloride (VA-044), and 1,1'-azobis(cyclohexanecarbonitrile); and photoinitiators (e.g., Irgacure (trade name) series).

The concentration of the polymerization initiator may be 0.5 to 5 mol % of the total amount of the polymerizable monomers.

Other additives may be optionally added to the polymerization reaction. Examples of other additives include polymerization accelerators, and crosslinking agents. Examples of polymerization accelerators include N,N,N',N'-tetramethylethylenediamine.

The polymerization reaction can be performed under suitable conditions, according to the polymerizability of the monomers for use, the half-life of the polymerization initiator, the temperature, and the like. For example, the polymerization reaction can be performed at a temperature of 0 to 100° C., and preferably, 20 to 25° C. The time period for the polymerization reaction may be 1 to 24 hours, and preferably 12 to 24 hours. When a photoinitiator is used for the polymerization initiator, the polymerization reaction can be performed by, for example, irradiating the mixture with UV light at a wavelength of 200 to 400 nm.

After the polymerization reaction, purification and drying are optionally performed, thereby preparing the target macromolecular material.

Examples of other methods for producing the first polymer include a method in which a guest group is introduced into the side chain of a polymer having no guest group. For example, the reaction point of a polymer having no guest group is chemically bonded to a guest molecule.

Likewise, examples of other methods for producing the second polymer include a method in which a host group is introduced into the side chain of a polymer having no host group. For example, the reaction point of a polymer having no host group is chemically bonded to a host group.

Additionally, other methods for producing the macromolecular material according to the first embodiment include a method in which a guest group and a host group are introduced in the side chains of a polymer having no guest group and host group.

Method for Producing Macromolecular Material According to Second Embodiment

The method for producing the macromolecular material according to the second embodiment is not particularly limited.

For example, the macromolecular material according to the second embodiment can be produced by subjecting to polymerization reaction a polymerizable monomer mixture containing the first polymerizable monomer, the second polymerizable monomer, and the third polymerizable monomer. For example, the macromolecular material according to the second embodiment can be produced in the same manner as in the method for producing the macromolecular material according to the first embodiment, except for the use of a polymerizable monomer mixture containing the first polymerizable monomer, the second polymerizable monomer, and the third polymerizable monomer for the polymerizable monomer for use in the polymerization reaction.

The first polymerizable monomer, the second polymerizable monomer, and the third polymerizable monomer are respectively the same as the first polymerizable monomer, the second polymerizable monomer, and the third polymerizable monomer for use in producing the macromolecular material according to the first embodiment.

The polymerization method can also be performed under the same conditions as the polymerization method for the macromolecular material according to the first embodiment, except for the use of a polymerizable monomer mixture containing the first polymerizable monomer, the second polymerizable monomer, and the third polymerizable monomer as a polymerizable monomer. The preferable aspect for the polymerization method is also the same.

The macromolecular material according to the present invention can also be produced by other production methods. For example, the macromolecular material can by produced by a method including the mixing step described above, the heating step described above, the step of applying the mixture heated in the heating step to a substrate to form a coating film, and the step of performing a polymerization reaction of this coating film. This method forms the macromolecular material into, for example, a film. Before applying the mixture, a polymerization initiator may be added to the mixture. Other components, such as a solvent and another polymerizable monomer, may optionally be added to the mixture. The method for applying the starting material solution to a substrate is not particularly limited. For example, the solution may be applied by a known technique. The polymerization reaction of the coating film can be performed, for example, by heating the coating film, or by irradiating the coating film with light, such as ultraviolet rays.

EXAMPLES

The following describes the present invention in more detail with reference to Examples. However, the present invention is not limited to the aspects of these Examples.

Example 1

28 mg (0.02 mmol) of 6-acrylamide methyl-γ-cyclodextrin, which is a polymerizable monomer having host groups, 4 mg (0.02 mmol) of (perfluoroethyl)methyl acrylate, which is a polymerizable monomer having guest groups, and pure water in an amount to give a solution concentration after the addition of acrylamide of 2 mol/kg were added to a reactor, thereby preparing a mixture (mixing step). The polymerizable monomer having host groups was present in an amount of 1 mol %, and the polymerizable monomer having guest groups was present in an amount of 1 mol % of the total amount of polymerizable monomers.

This mixture was heated to 80° C. or more, and 139 mg (1.96 mmol) of acrylamide, 4.6 mg (0.02 mmol) of ammonium persulfate, and 3.0 µL of [2-(dimethylamino)ethyl]dimethylamine were added thereto, followed by polymerization at room temperature for 1 hour, thereby obtaining a macromolecular material.

Example 2

The procedure of Example 1 was repeated, except for the use of 0.75 mol % of the polymerizable monomer having host groups, and 0.75 mol % of the polymerizable monomer having guest groups, thereby obtaining a macromolecular material.

Example 3

28 mg (0.02 mmol) of 6-acrylamide methyl-γ-cyclodextrin, which is a polymerizable monomer having host groups, 9 mg (0.02 mmol) of 2-(perfluorohexyl)ethyl acrylate, which is a polymerizable monomer having guest groups, and pure water in an amount to give a solution concentration after the addition of acrylamide of 2 mol/kg were added to a reactor, thereby preparing a mixture (mixing step). The polymerizable monomer having host groups was present in an amount of 1 mol %, and the polymerizable monomer having guest groups was present in an amount of 1 mol % of the total amount of polymerizable monomers.

This mixture was heated to 80° C. or more, and 139 mg (1.96 mmol) of acrylamide, 4.6 mg (0.02 mmol) of ammonium persulfate, and 3.0 µL of [2-(dimethylamino)ethyl]dimethylamine were added thereto, followed by polymerization at room temperature for 1 hour, thereby obtaining a macromolecular material.

Example 4

The procedure of Example 3 was repeated, except for the use of 0.75 mol % of the polymerizable monomer having host groups, and 0.75 mol % of the polymerizable monomer having guest groups, thereby obtaining a macromolecular material.

Example 5

28 mg (0.02 mmol) of 6-acrylamide methyl-γ-cyclodextrin, which is a polymerizable monomer having host groups, 9 mg (0.02 mmol) of (perfluoroheptyl)methyl acrylate, which is a polymerizable monomer having guest groups, and pure water in an amount to give a solution concentration after the addition of acrylamide of 2 mol/kg were added to a reactor, thereby preparing a mixture (mixing step). The polymerizable monomer having host groups was present in an amount of 1 mol %, and the polymerizable monomer having guest groups was present in an amount of 1 mol % of the total amount of polymerizable monomers.

This mixture was heated to 80° C. or more, and 139 mg (1.96 mmol) of acrylamide, 4.6 mg (0.02 mmol) of ammonium persulfate, and 3.0 µL of [2-(dimethylamino)ethyl]dimethylamine were added thereto, followed by polymerization at room temperature for 1 hour, thereby obtaining a macromolecular material.

Example 6

The procedure of Example 5 was repeated, except for the use of 0.75 mol % of the polymerizable monomer having host groups, and 0.75 mol % of the polymerizable monomer having guest groups, thereby obtaining a macromolecular material.

Example 7

The procedure of Example 3 was repeated, except for the use of 0.10 mol % of the polymerizable monomer having host groups, and 0.10 mol % of the polymerizable monomer having guest groups, thereby obtaining a macromolecular material.

Example 8

The procedure of Example 3 was repeated, except for the use of 0.05 mol % of the polymerizable monomer having host groups, and 0.05 mol % of the polymerizable monomer having guest groups, thereby obtaining a macromolecular material.

Comparative Example 1

24 mg (0.02 mmol) of 6-acrylamide methyl-β-cyclodextrin, 4 mg (0.02 mmol) of 1-acrylamide adamantane, and pure water in an amount to give a solution concentration after the addition of acrylamide of 2 mol/kg were added to a reactor, thereby preparing a mixture. 6-acrylamide methyl-β-cyclodextrin was present in an amount of 1 mol %, and 1-acrylamide adamantane was present in an amount of 1 mol % of the total amount of polymerizable monomers. 6-acrylamide methyl-β-cyclodextrin was prepared by a known method.

This mixture was heated to 90° C., and 139 mg (1.96 mmol) of acrylamide, 4.6 mg (0.02 mmol) of ammonium persulfate, and 3.0 µL of [2-(dimethylamino)ethyl]dimethylamine were added thereto, followed by polymerization at room temperature for 1 hour, thereby obtaining a macromolecular material. In this macromolecular material, host-guest interaction between β-cyclodextrin and adamantane can occur.

Comparative Example 2

The procedure of Comparative Example 1 was repeated, except for the use of 0.75 mol % of 6-acrylamide methyl-β-cyclodextrin and 0.75 mol % of 1-acrylamide adamantane, thereby obtaining a macromolecular material.

Tensile Test: Measurement of Breaking Strain

From the tensile-load curves of the macromolecular materials obtained in the Examples and Comparative Examples (Autograph AGX-plus produced by Shimadzu Corporation), the rupture point of each macromolecular material was observed, and this rupture point was determined to be the final point in measurement. This tensile test was performed with the bottom end of a macromolecular gel fixed, and the upper end pulled at a tension rate of 1.0 mm/sec (upward operation). The stroke (i.e., the maximum length of the pulled macromolecular material) was divided by the length of the macromolecular material before being pulled, and the resulting value was determined to be the breaking strain.

TABLE 1

| Examples/Comparative Examples | Content of First Structural Unit (mol %) | Content of Second Structural Unit (mol %) | Breaking Strain of Macromolecular Material (%) |
|---|---|---|---|
| Example 1 | 1 | 1 | 1916 ± 419 |
| Example 2 | 0.75 | 0.75 | 1261 ± 422 |
| Example 3 | 1 | 1 | 1328 ± 319 |

TABLE 1-continued

| Examples/ Comparative Examples | Content of First Structural Unit (mol %) | Content of Second Structural Unit (mol %) | Breaking Strain of Macromolecular Material (%) |
|---|---|---|---|
| Example 4 | 0.75 | 0.75 | 2021 ± 559 |
| Example 5 | 1 | 1 | 1759 ± 272 |
| Example 6 | 0.75 | 0.75 | 1805 ± 255 |
| Example 7 | 0.10 | 0.10 | 2971 ± 211 |
| Example 8 | 0.05 | 0.05 | 3577 ± 472 |
| Comparative Example 1 | 1 | 1 | (860) |
| Comparative Example 2 | 0.75 | 0.75 | (1136) |

Table 1 shows the values of breaking strain of the macromolecular materials obtained in Examples 1 to 8 and Comparative Examples 1 and 2. The results indicate that the macromolecular materials containing polymers having host groups and guest groups in their side chains and at least one fluorine group (in particular, the guest group has at least one fluorine group) have high breaking strain, and exhibit excellent elongation rate and flexibility.

Production Example 1: Production of N-Me-TMγCDAAmMe 0.95 mmol of a compound represented by the following formula (7-1) was weighed and placed in a Schlenk flask, and nitrogen replacement was performed.

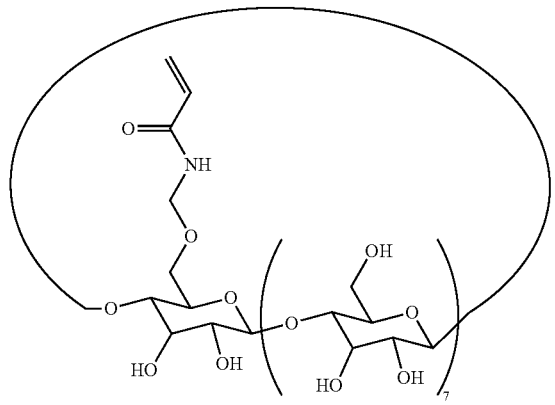

(7-1)

The compound represented by formula (7-1) was prepared as described below. 5 g (5 mmol) of γ-cyclodextrin, 700 mg (1.3 mmol) of N-hydroxymethyl acrylamide, and 95 mg (0.5 mmol) of p-toluenesulfonic acid monohydrate were weighed and placed in a 200-mL-glass-round-bottom flask, and this mixture was added to 25 mL of N,N-dimethylformamide, thereby preparing a mixture. This mixture was heated to 90° C. in an oil bath, and then heated with stirring for 1 hour, thereby preparing a reaction solution. Subsequently, the reaction solution was cooled, and poured into 45 mL of strongly stirred acetone. The generated precipitate was filtered off, and washed with 10 mL of acetone three times, followed by drying at room temperature under reduced pressure for 1 hour, thereby obtaining a reaction product. This reaction product was dissolved in 100 mL of distilled water, and passed through a column packed with a porous polystyrene resin (Mitsubishi Chemical Corporation Diaion HP-20) (apparent density: 600 g/L) to allow for adsorption for 30 minutes. Instead of this column, preparative high-pressure liquid chromatography was used to perform separation and purification in some cases. Thereafter, the solution component was removed, and 50 mL of a 10% methanol (or acetonitrile) aqueous solution was further passed through the column three times to wash the polystyrene resin, thereby removing unreacted γ-cyclodextrin. Subsequently, 500 mL of a 25% methanol aqueous solution was passed through the column twice to elute acrylamide methyl γ-cyclodextrin (γCDAAmMe), which was the target product. The solvent was removed under reduced pressure, thereby obtaining 809 mg of a white powder (the compound represented by formula (7-1)). The yield was about 15%.

30 mL of dehydrated N,N-dimethylformamide was added to a Schlenk flask containing a weighed compound represented by formula (7-1), and the mixture was stirred with ice cooling. 85.5 mmol of sodium hydride and 85.5 mmol of methyl iodide were further added thereto, and the mixture was stirred for 48 hours. Thereafter, 10 mL of water was added to the Schlenk flask and quenched. The resulting solution was dried under reduced pressure with an evaporator, and dissolved in 50 mL of a saturated sodium chloride aqueous solution (containing 200 mg of sodium thiosulfate pentahydrate), followed by extraction with 50 mL of toluene three times. The extracted toluene layer was dried with an evaporator. The obtained solids were dissolved in 50 mL of methanol, and washed with 50 mL of hexane, followed by drying the methanol layer with an evaporator, thereby obtaining a polymerizable monomer having host groups represented by the following formula (8-1), which was the target product.

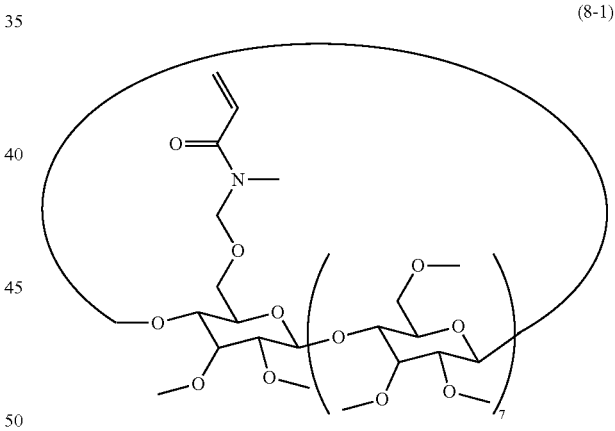

(8-1)

This polymerizable monomer having host groups is referred to as "N-Me-TMγCDAAmMe." From the results of the mass spectrum and NMR spectrum of the obtained N-Me-TMγCDAAmMe, generation of the target N-Me-TMγCDAAmMe was confirmed. All of the hydroxyl groups (100%) that were present per molecule of the cyclodextrin derivative in N-Me-TMγCDAAmMe were confirmed to have been replaced with methyl.

Production Example 2: Production of N—H-TAcγCDAAmMe 20 g of γ-CDAAmMe represented by formula (7-1) was dissolved in 300 mL of pyridine, and 170.133 g of acetic anhydride was added thereto, followed by stirring at 55° C. for more than 12 hours. 50 mL of methanol was added thereto to quench the reaction, and the content was concentrated to a volume of 200 mL with an evaporator. The obtained concentrated solution was added dropwise to 2000 mL of water to collect the precipitate. The precipitate was dissolved in 200 mL of acetone, and added dropwise to 2000 mL of water to collect the generated precipitate. This precipitate was dried under reduced pressure, thereby isolating N—H-TAcγAAmMe represented by the following formula (8-2), which was the target product.

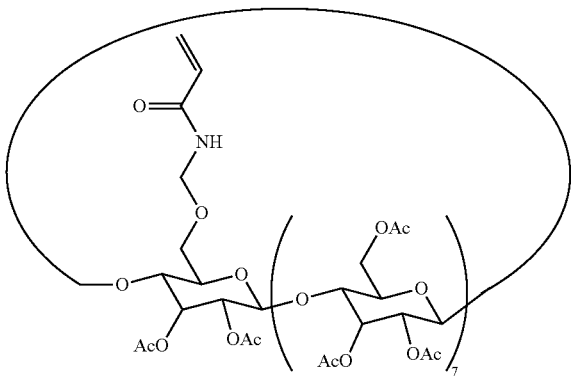

(8-2)

From the results of the mass spectrum and NMR spectrum, the generation of the target N—H-TAcγAAmMe was confirmed. All of the hydroxyl groups (100%) that were present per molecule of the cyclodextrin derivative in N—H-TAcγAAmMe were confirmed to have been replaced with acetyl, and N—H-TAcγAAmMe was confirmed to be the polymerizable monomer having host groups represented by formula (8-2).

Example 9

1 mol % of N-Me-TMγCDAAmMe (a polymerizable monomer having host groups) obtained in Production Example 1, 1 mol % of 2-(perfluorohexyl)ethyl acrylate (a polymerizable monomer having guest groups), and 98 mol % of ethyl acrylate were mixed, thereby preparing monomer A. This monomer A was subjected to ultrasound treatment for 1 hour. Subsequently, 1 mol % of Irugacure184, as a polymerization initiator, was added to monomer A. Monomer A was then irradiated with ultraviolet rays (A=365 nm) to perform a polymerization reaction. This polymerization reaction was performed such that monomer A was poured onto a butyl rubber sheet that was a test specimen cut out in a dumbbell shape, irradiated with ultraviolet rays from above, and dried in a vacuum oven overnight. This polymerization reaction gave a macromolecular material.

Example 10-1

The procedure of Example 9 was repeated, except that as a polymerizable monomer having host groups, N—H-TAcγAAmMe obtained in Production Example 2 was used instead of N-Me-TMγCDAAmMe, and that as a polymerizable monomer having guest groups, 2,2,2-trifluoroethyl acrylate was used instead of 2-(perfluorohexyl)ethyl acrylate, thereby obtaining a macromolecular material.

Example 10-2

The procedure of Example 10-1 was repeated, except that as a polymerizable monomer having guest groups, (perfluoroethyl)methyl acrylate was used instead of 2,2,2-trifluoroethyl acrylate, thereby obtaining a macromolecular material.

Example 10-3

The procedure of Example 10-1 was repeated, except that as a polymerizable monomer having guest groups, 2-(perfluorobutyl)ethyl acrylate was used instead of 2,2,2-trifluoroethyl acrylate, thereby obtaining a macromolecular material.

Example 10-4

The procedure of Example 10-1 was repeated, except that as a polymerizable monomer having guest groups, 2-(perfluorohexyl)ethyl acrylate was used instead of 2,2,2-trifluoroethyl acrylate, thereby obtaining a macromolecular material.

Example 10-5

The procedure of Example 10-1 was repeated, except that as a polymerizable monomer having guest groups, (perfluoroheptyl)methyl acrylate was used instead of 2,2,2-trifluoroethyl acrylate, thereby obtaining a macromolecular material.

Example 10-6

The procedure of Example 10-1 was repeated, except that as a polymerizable monomer having guest groups, 2-(perfluorodecyl)ethyl acrylate was used instead of 2,2,2-trifluoroethyl acrylate, thereby obtaining a macromolecular material.

Example 11-1

1 mol % of N—H-TAcγAAmMe obtained in Production Example 2 (a polymerizable monomer having host groups), 1 mol % of 2-(perfluorohexyl)ethyl acrylate (a polymerizable monomer having guest groups), and 98 mol % of ethyl acrylate were mixed in a reactor, thereby preparing monomer B. Monomer B was then stirred at 50° C. for 1 hour. Thereafter, 20 wt % of 2-propanol (solvent) based on the total weight of all of the polymerizable monomers, and 3 mg (0.014 mol) of Irgacure 184 (photoinitiator) were added to monomer B, and the mixture was irradiated with ultraviolet rays (A=365 nm) to perform a polymerization reaction. This polymerization reaction was performed such that monomer B was poured onto a butyl rubber sheet that was a test specimen cut out in a dumbbell shape, irradiated with ultraviolet rays from above, and then dried at 60° C. for 3 hours. This polymerization reaction gave a macromolecular material.

Example 11-2

The procedure of Example 11-1 was repeated, except that as a solvent, ethyl acetate was used instead of 2-propanol, thereby obtaining a macromolecular material.

Example 11-3

The procedure of Example 11-1 was repeated, except that as a solvent, butyl acetate was used instead of 2-propanol, thereby obtaining a macromolecular material.

Example 11-4

The procedure of Example 11-1 was repeated, except that as a solvent, 2-butanone (MEK) was used instead of 2-propanol, thereby obtaining a macromolecular material.

Comparative Example 3

The procedure of Example 9 was repeated, except that as a polymerizable monomer having guest groups, 2-ethyl-2-adamantyl acrylate was used instead of 2-(perfluorohexyl) ethyl acrylate, thereby obtaining a macromolecular material.

Comparative Example 4

The procedure of Example 9 was repeated, except that 1 mol % of 1,4-butanediol diacrylate, which is a bifunctional polymerizable monomer, was added instead of the polymerizable monomer having host groups and the polymerizable monomer having guest groups.

Comparative Example 5

The procedure of Example 9 was repeated, except that only ethyl acrylate was used as a polymerizable monomer without using the polymerizable monomer having host groups and the polymerizable monomer having guest groups, thereby obtaining a macromolecular material.

TABLE 2

| Examples/ Comparative Examples | Content of First Structural Unit (mol %) | Content of Second Structural Unit (mol %) | Solvent | Breaking Strain of Macromolecular Material (%) |
|---|---|---|---|---|
| Example 9 | 1 | 1 | Not Used | 900 ± 60 |
| Example 10-1 | 1 | 1 | Not Used | 528 ± 70 |
| Example 10-2 | 1 | 1 | Not Used | 694 ± 18 |
| Example 10-3 | 1 | 1 | Not Used | 690 ± 51 |
| Example 10-4 | 1 | 1 | Not Used | 690 ± 75 |
| Example 10-5 | 1 | 1 | Not Used | 704 ± 44 |
| Example 10-6 | 1 | 1 | Not Used | 615 ± 71 |
| Example 11-1 | 1 | 1 | 2-Propanol | 593 ± 57 |
| Example 11-2 | 1 | 1 | Ethyl Acetate | 676 ± 46 |
| Example 11-3 | 1 | 1 | Butyl Acetate | 649 ± 31 |
| Example 11-4 | 1 | 1 | 2-Butanone | 631 ± 70 |
| Comparative Example 3 | 1 | 1 | Not Used | 600 ± 20 |
| Comparative Example 4 | 1 mol % of Bifunctional Polymerizable Monomer | | Not Used | 272 ± 40 |
| Comparative Example 5 | 1 | 1 | Not Used | Not Measurable |

Table 2 shows the values of breaking strain of the macromolecular materials obtained in Example 9, Examples 10-1 to 10-6, Examples 11-1 to 11-4, and Comparative Examples 3 to 5. The results indicate that the macromolecular materials containing polymers having host groups and guest groups in their side chains and at least one fluorine group (in particular, the guest group has at least one fluorine group) have high breaking strain, and exhibit excellent elongation rate and flexibility, compared with the macromolecular material of the same kind but containing no fluorine group, and the macromolecular material having chemical crosslinkages due to a bifunctional polymerizable monomer. The use of an ethyl acrylate homopolymer that generates no crosslinkage (Comparative Example 5) resulted in a viscid, irregular-shaped material, on which it was difficult to perform the tensile test. In particular, in Example 9 and Examples 10-1 to 10-6, the hydrogen atom of the hydroxyl group of their cyclodextrin, which is the host site, was replaced with a methyl group or an acetyl group. This indicates that a macromolecular material that is largely composed of a hydrophobic monomer, such as ethyl acrylate, which is more hydrophobic than acrylamide used in Example 1, is obtainable. Additionally, as in Examples 11-1 to 11-4, organic solvents that are incompatible with water or hydrophobic (e.g., 2-propanol, ethyl acetate, butyl acetate, 2-butanone) can be used to perform a polymerization reaction, and this can incorporate an organic solvent into the resulting macromolecular material.

The invention claimed is:

1. A macromolecular material comprising
a first polymer containing a first structural unit, and
a second polymer containing a second structural unit,
the first structural unit having a guest group in the side chain thereof, and
the second structural unit having a host group in the side chain thereof,
wherein at least one of the first polymer and the second polymer has at least one fluorine group, and
wherein the host group is a group formed by bonding methylene to an oxygen atom derived from hydroxyl of a cyclodextrin or a derivative thereof, and the methylene is further bonded to the main chain or side chain of the second structural unit.

2. A macromolecular material comprising
a first structural unit having a guest group in the side chain thereof,
a second structural unit having a host group in the side chain thereof, and
a third structural unit that is other than the first structural unit and the second structural unit,
wherein at least one structural unit of the first structural unit, the second structural unit, and the third structural unit has at least one fluorine group, and
wherein the host group is a group formed by bonding methylene to an oxygen atom derived from hydroxyl of a cyclodextrin or a derivative thereof, and the methylene is further bonded to the main chain or side chain of the second structural unit.

3. The macromolecular material according to claim 1, wherein
the first structural unit includes
a structure represented by the following formula (1a)

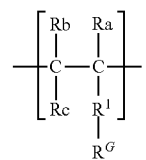

(1a)

wherein
Ra represents hydrogen, methyl, or fluorine,
Rb represents hydrogen or fluorine,
Rc represents hydrogen or fluorine,
$R^1$ represents either (i) a divalent group formed by removing one hydrogen atom from a monovalent group selected from the group consisting of hydroxyl, thiol, alkoxy, thioalkoxy, alkyl, amino, amide, phenyl, aldehyde, and carboxyl, or (ii) —O—(CH$_2$—CH$_2$—O)$_n$—, wherein n is 1 to 20, and
$R^G$ represents the guest group, and/or a structure represented by the following formula (1'a)

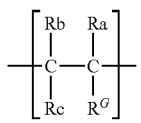
(1'a)

wherein
Ra, Rb, Rc, and $R^G$ are as defined in formula (1a).

4. The macromolecular material according to claim 3, wherein $R^G$ represents a hydrocarbon group.

5. The macromolecular material according to claim 3, wherein $R^G$ represents alkyl having at least one fluorine group.

6. The macromolecular material according to claim 3, wherein $R^G$ has 40 or fewer carbon atoms.

7. The macromolecular material according to claim 3, wherein $R^G$ has 3 to 20 carbon atoms.

8. The macromolecular material according to claim 1, further comprising a (meth)acrylic acid ester as a structural unit.

9. The macromolecular material according to claim 1, wherein the macromolecular material is a gel containing a solvent.

10. The macromolecular material according to claim 1, wherein the macromolecular material is suitable for use in at least one selected from the group consisting of coating films, vehicle body materials, paint, sealing materials, soft feeling coating agents, paint coating agents, and air filters.

11. The macromolecular material according to claim 2, wherein
the first structural unit includes
a structure represented by the following formula (1a)

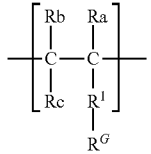
(1a)

wherein
Ra represents hydrogen, methyl, or fluorine,
Rb represents hydrogen or fluorine,
Rc represents hydrogen or fluorine,
$R^1$ represents either (i) a divalent group formed by removing one hydrogen atom from a monovalent group selected from the group consisting of hydroxyl, thiol, alkoxy, thioalkoxy, alkyl, amino, amide, phenyl, aldehyde, and carboxyl, or (ii) —O—(CH$_2$—CH$^2$—O)$_n$—, wherein n is 1 to 20, and
$R^G$ represents the guest group, and/or
a structure represented by the following formula (1'a)

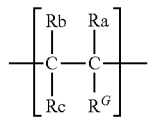
(1'a)

wherein
Ra, Rb, Rc, and $R^G$ are as defined in formula (1a).

12. The macromolecular material according to claim 11, wherein $R^G$ represents a hydrocarbon group.

13. The macromolecular material according to claim 11, wherein $R^G$ represents alkyl having at least one fluorine group.

14. The macromolecular material according to claim 11, wherein $R^G$ has 40 or fewer carbon atoms.

15. The macromolecular material according to claim 11, wherein $R^G$ has 3 to 20 carbon atoms.

16. The macromolecular material according to claim 2, further comprising a (meth)acrylic acid ester as a structural unit.

17. The macromolecular material according to claim 2, wherein the macromolecular material is a gel containing a solvent.

18. The macromolecular material according to claim 2, wherein the macromolecular material is suitable for use in at least one selected from the group consisting of coating films, vehicle body materials, paint, sealing materials, soft feeling coating agents, paint coating agents, and air filters.

* * * * *